United States Patent
Srivastava

(10) Patent No.: US 10,635,611 B1
(45) Date of Patent: Apr. 28, 2020

(54) DEVICE, SYSTEM AND METHOD FOR DETERMINING AN ORIENTATION OF A CONNECTION TO AN IO INTERFACE

(71) Applicant: Intel Corporation, Santa Clara, CA (US)

(72) Inventor: Amit K. Srivastava, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/254,345

(22) Filed: Jan. 22, 2019

(51) Int. Cl.
*G06F 13/20* (2006.01)
*G06F 13/40* (2006.01)
*G06F 13/42* (2006.01)

(52) U.S. Cl.
CPC .......... *G06F 13/20* (2013.01); *G06F 13/4068* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

2018/0027330 A1* 1/2018 Rand .................... G06F 13/387
381/309

* cited by examiner

*Primary Examiner* — Idriss N Alrobaye
*Assistant Examiner* — Dayton Lewis-Taylor
(74) *Attorney, Agent, or Firm* — Green, Howard & Mughal LLP

(57) ABSTRACT

Techniques and mechanisms for determining an orientation of a connection to an input and/or output (IO) interface of a device. In an embodiment, the device receives one or more signals, each via a respective contact of the IO interface, and identifies the orientation based a signal characteristic of the one or more signals. A communication mode of the device is then configured to accommodate the orientation. A physical arrangement of the IO interface is compatible with a signal plan of an interface type which is defined by an interface specification. The one or more signals are each of a respective signal type other than any signal type which, according to the interface specification, is to provide a basis for orientation identification. In some embodiments, the interface specification is a USB-C specification.

19 Claims, 9 Drawing Sheets

US 10,635,611 B1

DEVICE, SYSTEM AND METHOD FOR DETERMINING AN ORIENTATION OF A CONNECTION TO AN IO INTERFACE

BACKGROUND

1. Technical Field

Embodiments of the invention relate generally to operation of interconnected circuitry and more particularly, but not exclusively, to indicating an orientation of a connector coupled to a circuit device.

2. Background Art

The Universal Serial Bus Type-C (USB-C) specification is one example of an interface specification which allows any of multiple possible orientations of a given connection between devices. Such devices typically support both functionality to automatically determine a connection orientation, and other functionality such as device debug. To date, debug operations, an alternate guest protocol and other functionality at a typical USB-C compatible device has been limited due at least in part to the unavailability of power management circuitry during an early boot phase of the device. As new applications for USB-C continue to grow in number and variety, there is expected to be an increasing demand for solutions which provide incremental improvements to speed and/or power efficiencies.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
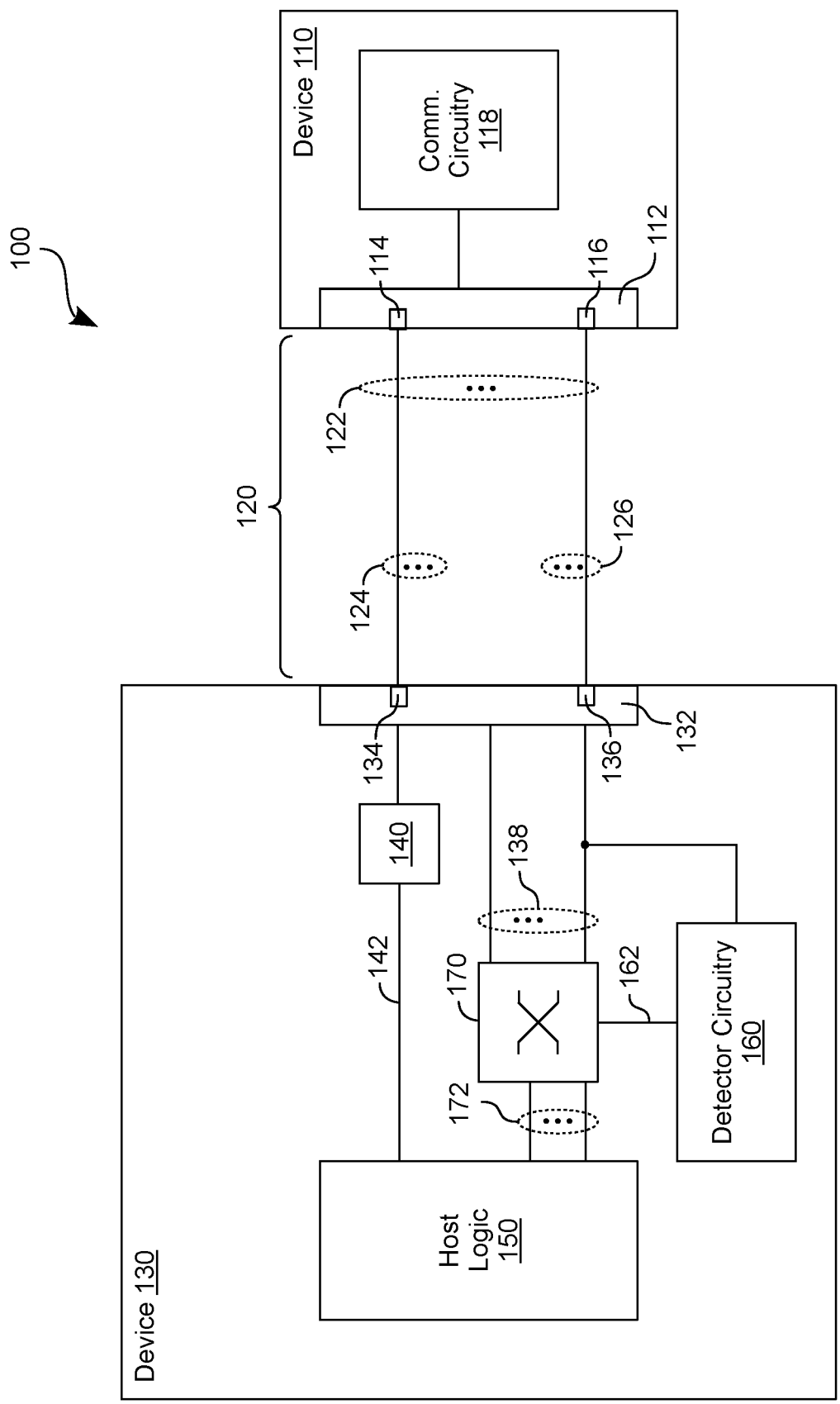
FIG. 1 illustrates a functional block diagram which shows elements of a system to identify the orientation of a connection between circuits according to an embodiment.

Embodiments described herein variously provide techniques and mechanisms for determining an orientation of a connection to an input and/or output (IO) interface of a device. In some embodiments, the IO interface is compatible with a signal plan of an interface type which is specified or otherwise indicated by an interface specification. The signal plan defines a physical arrangement of pins (or other such conductive contacts) of the interface type, where some or all such pins/contacts are each identified as corresponding to a respective signal type. In an embodiment, the various signal types include at least one signal type which, according to the interface specification, is to provide communications which contribute to (e.g., provide a basis for) orientation identification. The signal types also include at least one signal type other than any which, according to the interface specification, is to contribute to orientation identification.

The term "connection orientation," as used herein, refers to a relative correspondence of the conductive contacts of one IO interface to the conductive contacts some other IO interface which is coupled thereto. As used herein, "orientation identification functionality," "orientation identification" and similar phrases variously refer to the characteristic of determining that a given connection to an IO interface has a particular orientation—e.g., as opposed to that connection instead having some different possible orientation instead.

In some embodiments, a device receives, at an IO interface thereof, one or more signals which facilitate an orientation identification by that device. The IO interface is compatible with an interface type which is indicated by an interface specification. One example of such an interface specification is the "Universal Serial Bus Type-C Cable and Connector Specification, Release 1.3," published Jul. 14, 2017 by the USB 3.0 Promoter Group (referred to herein as the "USB-C specification"). The one or more signals are each of a respective signal type other than any which, according to an interface specification, is to contribute to orientation identification. However, embodiments variously adapt communications according to the interface specification, to provide via the one or more signals some indicia of a particular connection orientation. In some embodiments, an orientation identification is performed, based on the one or more signals, while some orientation identification functionality of the device is disabled or otherwise prevented from operating—e.g., during an early boot phase of the device.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

FIG. 1 shows features of a system 100 to identify an orientation of a connection between devices according to an embodiment. System 100 is one example of an embodiment wherein an orientation identification functionality is facilitated by one or more signals, communicated with a hardware interface that is compatible with an interface specification, as an alternative to such functionality being provided (according to the interface specification) using one or more other types of signals. The interface specification is a Universal Serial Bus Type-C (USB-C) specification, in some embodiments.

As shown in FIG. 1, system 100 comprises devices 110, 130 and an interconnect 120 coupled to facilitate communication between devices 110, 130. Device 130 comprises one or more integrated circuit (IC) chips—e.g., wherein device 130 comprises multiple IC chips which, for example, are arranged in a die stack configuration. In some embodiments, device 130 is (or otherwise includes) a packaged device which comprises such one or more IC chips. Device 110 provides functionality to operate, in one or more respects, as a source device with respect to at least some communication with device 130. In some embodiments, device 110 and device 130 further operate as a sink device and a source device (respectively) with respect to one or more other communications.

During operation of system 100, device 110 transmits one or more signals to device 130 via interconnect 120, wherein circuitry of device 130 identifies, based on the one or more signals, an orientation of the connection to device 110 via interconnect 120. For example, such circuitry detects whether the one or more signals include a first signal characteristic which is predefined as being indicative of a first connection orientation (e.g., as opposed to some other second signal characteristic which is to be indicative of a different connection orientation). In some embodiments, the one or more signals includes two signals, wherein the signal characteristic includes a coincidence, or other such combination, of respective characteristics of the two signals. Based on the detected signal characteristic, a communication mode of device 130 is configured to accommodate the indicated connection orientation.

In the example embodiment shown, device 110 comprises an input/output (IO) interface 112 by which device 110 is to couple to interconnect 120. IO interface 112 includes a first plurality of conductive contacts (e.g., comprising metal pins, pads, balls or other conductive structures such as the illustrative contacts 114, 116 shown), an arrangement of which is compatible, for example, with the signal plan of an interface type which is identified by the interface specification. In such an embodiment, some or all of the first plurality of conductive contacts each correspond to a respective signal type, where such correspondence is according to the signal plan and based on a physical arrangement of the first one or more conductive contacts—e.g., relative to each other and/or relative to other contacts of IO interface 112. For example, with respect to the signal plan, a first one or more conductive contacts of IO interface 112 (e.g., including the illustrative contact 116 shown) each correspond to a respective signal type other than any signal type which, according to the interface specification, is to contribute to an identification of a connection orientation. By contrast, a second one or more conductive contacts of IO interface 112 (e.g., including the illustrative contact 114 shown) each correspond to a respective signal type which, according to the interface specification, is to contribute to an identification of a connection orientation.

Alternatively or in addition, device 130 comprises an IO interface 132 by which device 130 is to couple to interconnect 120. IO interface 132 includes a second plurality of conductive contacts (e.g., comprising the illustrative contacts 134, 136 shown), an arrangement of which is compatible, for example, with the signal plan indicated by the interface specification. For example, according to the signal plan, a third one or more conductive contacts of IO interface 132 (e.g., including the illustrative contact 136 shown) each correspond to a respective signal type other than any signal type which, according to the interface specification, is to contribute to an identification of a connection orientation. By contrast, a fourth one or more conductive contacts of IO interface 132 (e.g., including the illustrative contact 134 shown) each correspond, according to the signal plan, to a respective signal type which, per the interface specification, is to contribute to an identification of a connection orientation.

In such an embodiment, signal lines 122 of interconnect 120 each couple a respective contact of IO interface 112 to a respective contact of IO interface 132. For example, a first one or more signal lines 126 each couple a respective one of the first one or more conductive contacts of IO interface 112 to respective one of the third one or more conductive contacts of IO interface 132—e.g., wherein a second one or more signal lines 124 each couple a respective one of the second one or more conductive contacts of IO interface 112 to a respective one of the fourth one or more conductive contacts of IO interface 132. In some embodiments, connector hardware (not shown), at one or both distal ends of interconnect 120, facilitate signal lines 122 being coupled to, and decoupled from, one or both of IO interfaces 112, 132.

In some embodiments, the interface specification is a USB-C specification, where the one or more signal lines 126 are each coupled to communicate a respective signal—e.g., one of SBU1 or SBU2—of a sideband use (SBU) signal type. Functionality of such signal communication according to the USB-C specification is extended, in such embodiments, to further provide a basis for device 130 to identify an orientation of the connection between IO interface 132 and device 110. In one such embodiment, the one or more signal lines 124 are each coupled to communicate a respective signal—e.g., one of CC1 or CC2—of a configuration channel (CC) signal type which, according to the USB-C interface, is also able to provide a basis for determining a connection orientation.

Device 110 further comprises circuit logic (such as the illustrative communication circuitry 118 shown) which is coupled to participate in communications via IO interface 112. Communication circuitry 118 supports a protocol for communication with device 130 via IO interface 112 and interconnect 120—e.g., where the protocol is compatible with (but includes an extension of and/or other modification to) a protocol which is specified or otherwise indicated by the interface specification. For example, communication circuitry 118 supplements communications by one or more signal types—including one or more sideband use (SBU) signal types—to further support an auxiliary orientation identification functionality with said one or more signal types.

In the example embodiment shown, device 130 further comprises configuration circuitry 170 and host logic 150 which is coupled, via configuration circuitry 170, to the third one or more conductive contacts of IO interface 132 which, for example, include contact 116. Host logic 150 illustrates circuitry which is operable to participate in data communications via IO interface 132. In some embodiments, for example, host logic 150 comprises receiver circuitry to receive data signals each from a respective contact of IO interface 132. Alternatively or in addition, host logic comprises transmitter circuitry to communicate data signals each to a respective contact of IO interface 132. In some embodiments, transmitter and/or receiver circuitry of host logic 150 comprises one or more protocol stacks which support a protocol for communication with communication circuitry 118.

In various embodiments, host logic 150 (and/or or other circuitry of device 130 which is coupled thereto) provides some or all of the functionality of an otherwise conventional USB-C chipset. For example, host logic 150 (or other circuitry coupled thereto) comprises one or more processor cores, a memory controller, memory array and/or the like. In some embodiments, host logic 150 includes, or otherwise operates responsive to, state transitions of a state machine which, in some embodiments, is compatible with a state diagram of the interface specification. However, some embodiments are not limited to a particular functionality which is provided by device 130 based on communications with transmitter circuitry and/or receiver circuitry of host logic 150.

To accommodate a given connection orientation, some embodiments provide a corresponding communication mode of device 130 by enabling the selective configuration (e.g., reconfiguration) of certain paths by which signals are to be variously communicated between host logic 150 and at least some conductive contacts of IO interface 132. For example, in the embodiment shown, device 130 further comprises circuit logic (such as the illustrative detector circuitry 160 shown) which is coupled to to receive, snoop or otherwise detect the one or more signals which are are received at IO interface 132 via the one or more signal lines 126. Based on a detected signal characteristic of the one or more signals, detector circuitry 160 generates a signal 162 which indicates a corresponding connection orientation.

The signal 162 is received by circuit logic of device 130—such as the illustrative configuration circuitry 170 shown—which is operable to selectively couple or otherwise enable a set of signal paths each to facilitate communication between IO interface 132 and host logic 150. By way of illustration and not limitation, signal lines 138 are variously coupled each between configuration circuitry 170 and a respective contact of IO interface 132, wherein other signal lines 172 variously coupled each between configuration circuitry 170 and host logic 150. Configuration circuitry 170 comprises switch circuitry which is operable—e.g., responsive to signal 162—to select from among any of a plurality of communication modes including at least a first communication mode to accommodate a first connection orientation, and a second communication mode to accommodate a second connection orientation which is an opposite of (or otherwise different than) the first connection orientation. For example, configuration circuitry 170 includes one or more cross-bar switches (or other suitable circuitry) to selectively choose between different combinations of signal paths being variously enabled or disabled.

In one such embodiment, the first communication mode enables a first combination of signal paths each between a respective one of signal lines 138 and a respective one of signal lines 172, wherein the first combination of signal paths (via configuration circuitry 170) provide a first correspondence of signal lines 138 each to a respective one of signal lines 172. By contrast, a second communication mode of configuration circuitry 170 enables a second combination of signal paths each between a respective one of signal lines 138 and a respective one of signal lines 172, wherein the second combination of signal paths (via configuration circuitry 170) provide a second correspondence of signal lines 138 each to a respective one of signal lines 172. In such an embodiment, the second correspondence is an opposite of, or otherwise different than, the first correspondence. In providing selection between any of multiple possible communication modes, each to provide a different respective correspondence between signal lines 138 and signal lines 172, configuration circuitry 170 is operable to accommodate different orientations with which device 110 (or other hardware external to device 130) might connect to IO interface 132.

In some embodiments, host logic 150 is further coupled, via other circuitry 140 of device 130, to the fourth one or more conductive contacts of IO interface 132 (e.g., where the fourth one or more conductive contacts include contact 134). For example, circuitry 140 and configuration circuitry 170 are each coupled between host logic 150 and IO interface 132 via respective paths which are distinct from, and independent of, each other. Circuitry 140 illustrates any of a various types of circuit logic which are suitable to configure or otherwise control one or more operational characteristics of host logic 150—e.g., where such control is based on one or more signals received via the fourth one or more conductive contacts of IO interface 132. In various embodiments, some or all of these one or more signals are of a signal type which, according to the interface specification, is to provide a basis for determining a connection orientation.

In an embodiment, circuitry 140 is capable of identifying a connection orientation according to a technique which is specified or otherwise indicated by the interface specification. Alternatively or in addition, circuitry 140 provides control functionality—such as that of a power management controller—which configures or otherwise determines a delivery of a supply voltage to host logic 150. For example, circuitry 140 controls power use and/or other operational characteristics of host logic 150 with one or more control signals (e.g., including the illustrative signal 142 shown) which are generated based on the one or more signals received with the fourth one or more conductive contacts.

In some embodiments, circuitry 140 is further coupled to control the configuration of a communication mode of device 130 to accommodate a given connection orientation. For example, other control signaling (not shown) from circuitry 140, in some embodiments, is able to control the selective enabling of signal paths with configuration circuitry 170. In such an embodiment, operation of configuration circuitry 170 by detector circuitry 160 provides an auxiliary mechanism for accommodating any or multiple different possible connection orientations. This auxiliary mechanism is available, for example, during a period of time when circuitry 140 is not able to perform at least some function of an orientation identification process. In one illustrative embodiment, device 110 is a debug unit which is to participate in a debug process which evaluates the performance of device 130. At least some portion of such a debug process takes place, for example, prior to the completion of a boot-up sequence to bring functionality of circuitry 140 online. Accordingly, although circuitry 140 supports the determining of a connection orientation (e.g., according to conventional techniques of an interface specification), device 110 does not necessarily use the one or more signal lines 124 to provide any such basis for determining a connection orientation.

Figure 2:
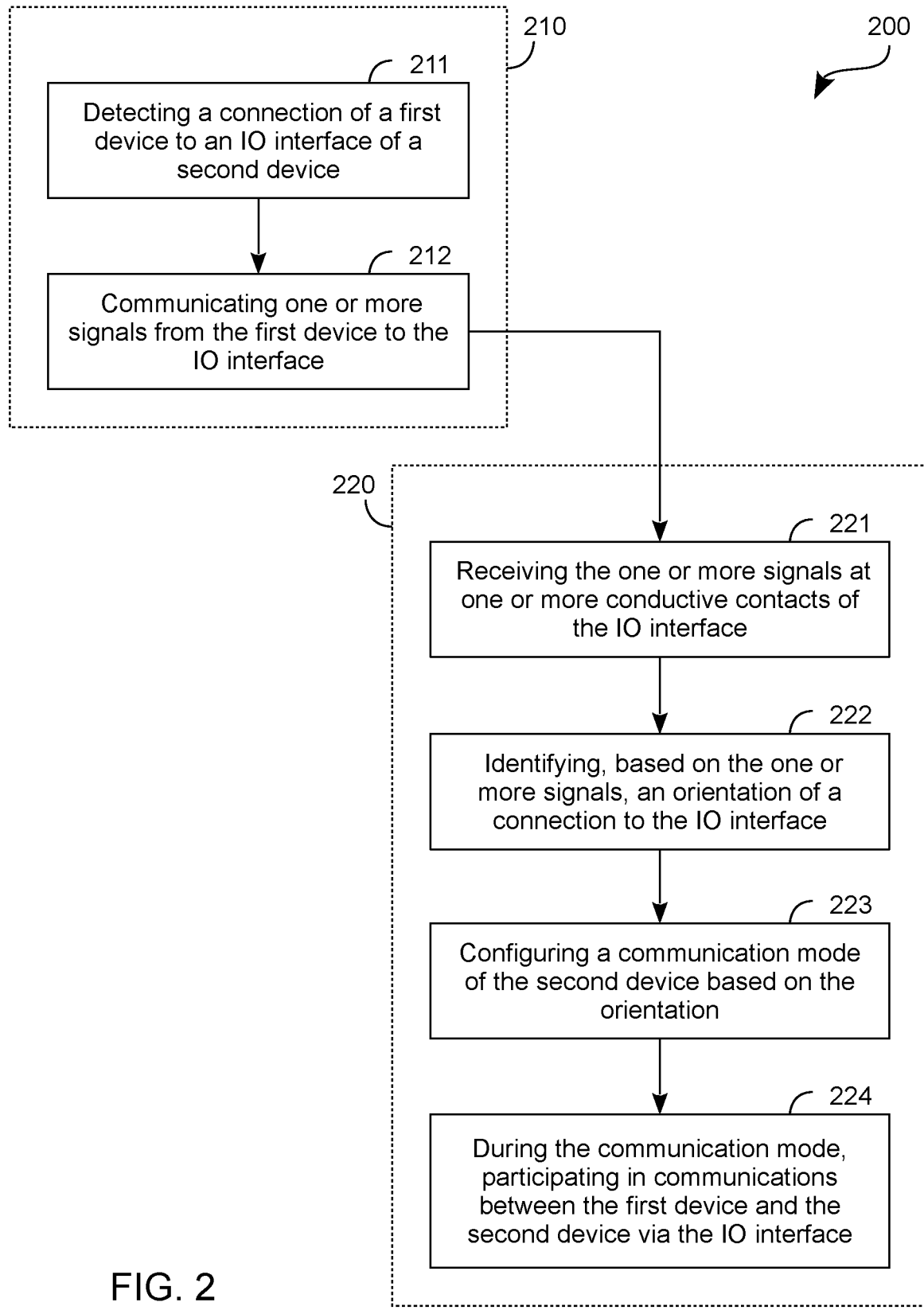
FIG. 2 illustrates a flow diagram which shows elements of a method for identifying the orientation of a connection with a circuit device according to an embodiment.

FIG. 2 shows features of a method 200 to detect a connection orientation according to an embodiment. Method 200 is performed with circuitry of system 100, for example. As shown in FIG. 2, method 200 includes operations 210 performed by a first device (such as device 110) which, in one or more respects, is to function as a source device with respect to communications with a second device which is coupled thereto.

Operations 210 comprise (at 211) the first device detecting a connection to an IO interface of a second device. The IO interface of the second device is compatible with a signal plan of an interface specification which identifies one or more signal types each to contribute to an identification of a connection orientation. In an embodiment, the interface specification is a Universal Serial Bus Type-C (USB-C) specification which describes the use of configuration channel (CC) signals in providing an orientation identification functionality.

Based on the detecting at 211, operations 220 perform (at 212) a communicating of one or more signals from the first device to the IO interface of the second device. In an embodiment, the one or more signals each correspond to—e.g., support functionality of—a respective signal type other than any (such as a CC signal type) which, according to the interface specification, is to contribute to the identification of the connection orientation. For example, some or all of the one or more signals correspond functionally to a sideband use (SBU) signal type of a USB-C specification. However, some embodiments extend the functionality of the signal type at least insofar as it is adapted to further communicate information to identify a connection orientation.

In some embodiments, method 200 additionally or alternatively comprises operations 220 performed by the second device (e.g., device 130) which, in one or more respects, is to function as a sink device with respect to communications with the first device. For example, operations 220 comprise (at 221) receiving the one or more signals—communicated at 212—at one or more conductive contacts of the IO interface. In some embodiments, the relative locations of each of the one or more conductive contacts correspond, according to the signal plan of the interface specification, to a respective sideband signal type.

Operations 220 further comprise (at 222) identifying, based on the one or more signals, an orientation of a connection to the IO interface. The identifying at 222 includes, for example, detecting a signal characteristic which has been predefined as being indicative of one (and only one) connection orientation of multiple possible connection orientations, and selecting a communication mode which corresponds to the indicated connection orientation. Operations 220 further comprise (at 223) configuring a communication mode of the second device based on the orientation. For example, the configuring at 223 includes a cross-bar switch or other suitable switch circuitry selectively enabling first signal paths of communication between the IO interface and host circuitry of the second device. In some embodiments, such enabling includes disabling one or more other signal paths which otherwise would be enabled during an alternative communication mode (to accommodate a different connection orientation). Operations 220 further comprise (at 224) participating in communications, during the communication mode configured at 223, between the first device and the second device via the IO interface. In some embodiments, the participating at 224 includes providing communications to facilitate a debug process by which the first device is to evaluate operational characteristic of the first device.

The IO interface further comprises, in some embodiments, a second one or more conductive contacts which are each coupled to host circuitry of the second device via second circuitry of the second device (such as circuitry 140). The relative locations of these second one or more conductive contacts each correspond, according to the signal plan of the interface specification, to a respective signal type (such as a CC signal type) which is to contribute to the identification of a connection orientation. The configuring of the communication mode at 223 comprises, for example, enabling signal paths each between the host circuitry and a respective contact of the IO interface, wherein the signal paths are each independent of the second circuitry (e.g., independent of circuitry 140).

In one such embodiment, method 200 comprises additional operations (not shown) to determine an orientation of a different connection to the IO interface—e.g., a subsequent, or earlier, connection between the second device and a device other than the first device which performs operations 210. For example, such additional operations include receiving a second one or more signals at the second one or more conductive contacts of the IO interface and identifying (with a functionality of the second circuitry, based on the second one or more signals) a second orientation of a second connection to the IO interface. These additional operations further comprise, for example, configuring a second communication mode of the device based on the second orientation. In some embodiments, the functionality of the second circuitry (such as circuitry 140), which is used to identify the second orientation, is disabled, not completely booted or otherwise unavailable then the identification of the orientation is performed at 222 (e.g., with detector circuitry 160, for example).

Figure 3:
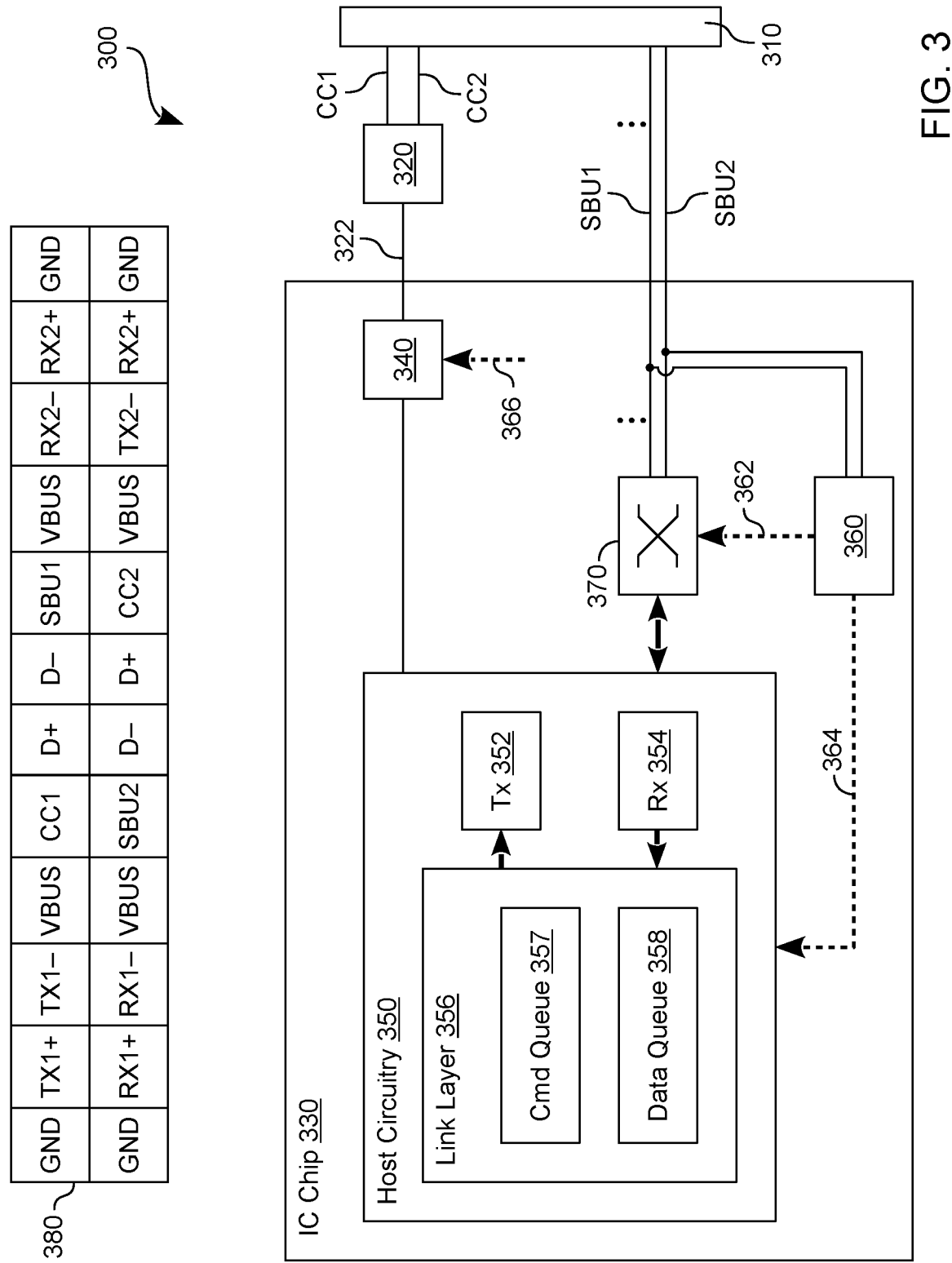
FIG. 3 illustrates a functional block diagram which shows elements of a device to identify the orientation of a connection to another device according to an embodiment.

FIG. 3 shows features of a device 300 to evaluate signaling which indicates a connection orientation according to an embodiment. Device 300 illustrates an embodiment which extends or otherwise modifies a connection orientation functionality that—according to an interface specification (in this example, a USB-C specification)—utilizes a configuration channel (CC) signal type. In one such embodiment, another signal type identified by the USB-C standard—e.g., a sideband use (SBU) signal type—is used to facilitate an auxiliary or alternative connection orientation functionality. Device 300 includes features of device 130, for example, and/or is operable to perform some or all of operations 220.

As shown in FIG. 3, device 300 includes an IO interface 310, host circuitry 350, detector circuitry 360, and configuration circuitry 370 which, for example, correspond functionally to IO interface 132, host logic 150, detector circuitry 160, and configuration circuitry 170 (respectively). Conductive contacts (e.g., including metal pins, pads, balls or the like) of IO interface 310 have a physical arrangement, relative to one another, which corresponds—for example—to that which is defined by a signal plan of the USB-C interface specification.

In the example embodiment shown, such contacts of IO interface 310 have an arrangement 380 which facilitates either of at least two possible connection orientations—e.g., to provide for an at least partially reversible plug connector. Arrangement 380 provides a 24-contact double-sided connector interface which, for example, comprises four power/ground pairs (GND), two differential pairs (D+, D−) for a high speed (HS) data bus, four pairs (TX1+, TX1−, RX1+, RX1−, TX2+, TX2−, RX2+, RX2−) for a super-speed (SS) data bus, and power interface contacts (VBUS). In arrangement 380, respective contacts for data signals D+ and D− are disposed along a top row of contacts, where other such contacts are disposed, in an opposite linear order, along a bottom row of contacts, such that data signals D+ and D− are diametrically opposed along a column-wise direction. This positioning of contacts for data signal facilitates a reversible functionality such that a plug is able to be received in either a right side up or an upside down disposition at a USB Type-C connector.

Arrangement 380 further comprises two contacts to communicate sideband use signals (SBU1 and SBU2), which, according to the USB-C specification, are not designated for any use to signify the orientation of a connection with a given connector which has arrangement 380. However, in some scenarios according to various embodiments, the signals SBU1 and SBU2 are adapted to further communicate information to be used by device 300 in at least some situations—e.g., during a period of time when device 300 is preparing for (or performing) debug operations or an alternate guest protocol mode—to determine a connection orientation.

Arrangement 380 further comprises two contacts to communicate configuration channel signals (CC1 and CC2) which, according to the USB-C specification, are to be used at least in part to signify the orientation of a connection with a given connector which has arrangement 380. However, in some scenarios according to various embodiments, the signals CC1 and CC2 are not used by device 300 to determine a connection orientation in at least some situations—e.g., during (or in preparation for) debug operations with device 300 or an alternate guest protocol mode—when other orientation identification functionality is unavailable.

During operation of device 300, IO interface 310 receives, from a source device (e.g., device 110) coupled to device 300, signals which are compatible with the USB-C specification. Detector circuitry 360 is coupled to receive, snoop or otherwise detect signals SBU1, SBU2, and to determine, based on a signal characteristic of said signals, an orientation of the connection between IO interface 310 and the source device. Based on the detected signal characteristic, detector circuitry 360 outputs a control signal 362 which indicates a corresponding connection orientation. Responsive to control signal 362, configuration circuitry (e.g., including a crossbar switch) switchedly configures a set of signal paths to provide a communication mode which accommodates the indicated connection orientation.

Although some embodiments are not limited in this regard, host circuitry 350 comprises a link layer 356 of a protocol stack with which signals are communicated, via configuration circuitry 370, between host circuitry 350 and IO interface 310. For example, link layer 356 comprises one or more transmit queues and/or one or more receive queues—e.g., including the illustrative command queue 357 and data queue 358 shown—to facilitate communication with a physical layer (PHY) of the protocol stack (represented by the illustrative receiver circuitry Rx 354 and transmitter circuitry Tx 352 shown).

In one such embodiment, host circuitry 350 also receives one or more control signals 364 as a result of detector circuitry 360 determining the connection orientation which is indicated by signals SBU1, SBU2. For example, the one or more control signals 364 interrupt or otherwise change to the timing of operations by host circuitry 350, in some embodiments. Alternatively or in addition, host logic 350 clears command queue 357, data queue 358 and/or one or more other such queues in response to the one or more control signals 364. By providing a hardware based interrupt and/or queue clearing mechanisms with the one or more control signals 364 (e.g., a mechanism which does not require the involvement of software), some embodiments provide a low latency mechanism for accommodating a connection orientation at a relatively early time during boot-up of device 300.

In the example embodiment shown, host circuitry 350, detector circuitry 360 and configuration circuitry 370 reside on the same integrated circuit (IC) chip 330 of device 300. In one such embodiment, functionality of circuitry 140 is provided, for example, with a combination of circuitry 340 disposed on IC chip 330, and another IC chip 320 which is coupled to IC chip 330. For example, IC chip 320 provides functionality to determine a connection orientation (and/or other system state) based on signals CC1, CC2—e.g., according to techniques indicated in the USB-C specification—and circuitry 340 provides functionality to perform at least some power management of host circuitry 350. In some embodiments, IC chip 320 communicates system state information to circuitry 340 via a bus 322 which, for example, is compatible with a bus specification such as an $I^2C$ bus specification. Alternatively or in addition, circuitry 340 is coupled to receive a signal 366—e.g., from host circuitry 350 or detector circuitry 360—which specifies or otherwise indicates the connection orientation which has been determined by detector circuitry 360 based on signals SBU1, SBU2. Accordingly, power management with circuitry 340 can take place during a debug (or other) mode when—for example—IC chip 320 is unable to provide orientation identification functionality based on signals CC1, CC2.

Figure 4:
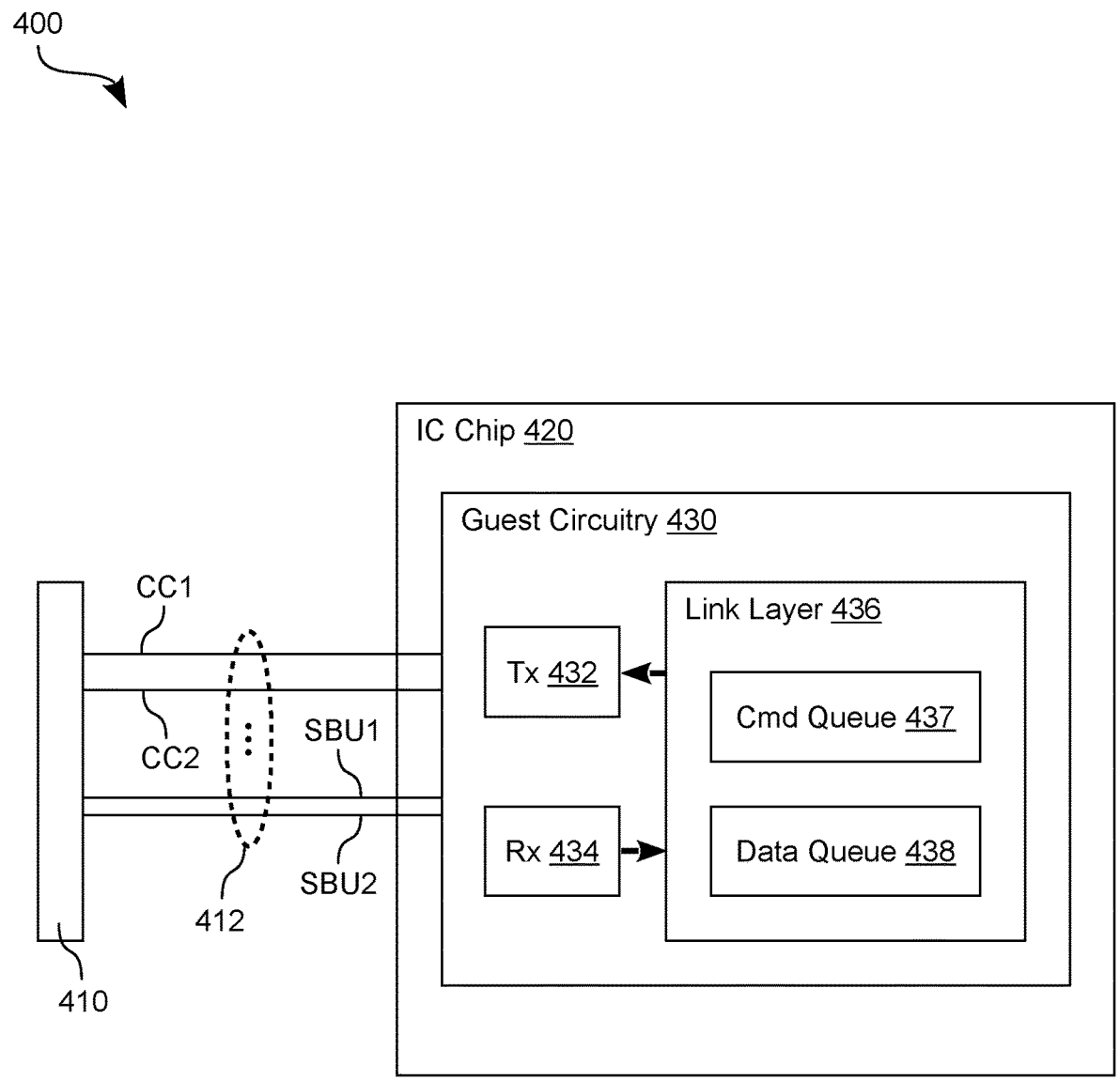
FIG. 4 illustrates a functional block diagram which shows elements of a device to communicate a signal used to identify a connection orientation according to an embodiment.

FIG. 4 shows features of a device 400 to provide signaling which is to be evaluated for identifying a connection orientation according to an embodiment. Device 400 illustrates another embodiment which modifies a connection orientation functionality of a USB-C specification—e.g., wherein a sideband use (SBU) signal type is adapted to facilitate an auxiliary or alternative connection orientation functionality. Device 400 includes features of device 110, for example, and/or provides functionality to perform operations of method 200 (in some embodiments, with device 300).

As shown in FIG. 4, device 400 includes an IO interface 410 and guest circuitry 430 that, for example, is disposed on an IC chip 420. Guest circuitry 430 supports a communication protocol which, in an embodiment, is compatible with a USB-C specification—e.g., where the protocol is adapted to provide an alternative or auxiliary mechanism for communicating information to identify a connection orientation. In the example embodiment shown, guest circuitry 430 comprises a link layer 436 of a protocol stack with which signals are communicated, via signal lines 412, between guest circuitry 430 and IO interface 410. For example, link layer 436 comprises one or more transmit queues and/or one or more receive queues—e.g., including the illustrative command queue 437 and data queue 438 shown—to facilitate communication with a PHY of the protocol stack (represented by the illustrative receiver circuitry Rx 434 and transmitter circuitry Tx 432 shown).

In the embodiment shown, signals communicated with signal lines 412 include sideband use signals (SBU1 and SBU2), which, according to the USB-C specification, are not designated for any use to signify the orientation of a given connection with IO interface 410. However, in some scenarios according to various embodiments, the signals SBU1 and SBU2 are adapted to further communicate information to be used by another device (e.g., device 300) to determine a connection orientation in at least some situations. For example, SBU1 and SBU2 are adapted to enable orientation identification by another device when that other device is booting up or otherwise preparing for (or participating in) debug operations. In some embodiments, signal lines 412 also communicate configuration channel signals (CC1 and CC2). However, in some scenarios the signals CC1 and CC2 are not used by device 400 to identify a connection orientation in at least some situations—e.g., when another device, coupled to device 400 via IO interface 410, is booting up or otherwise preparing for (or participating in) debug operations.

Figure 5:
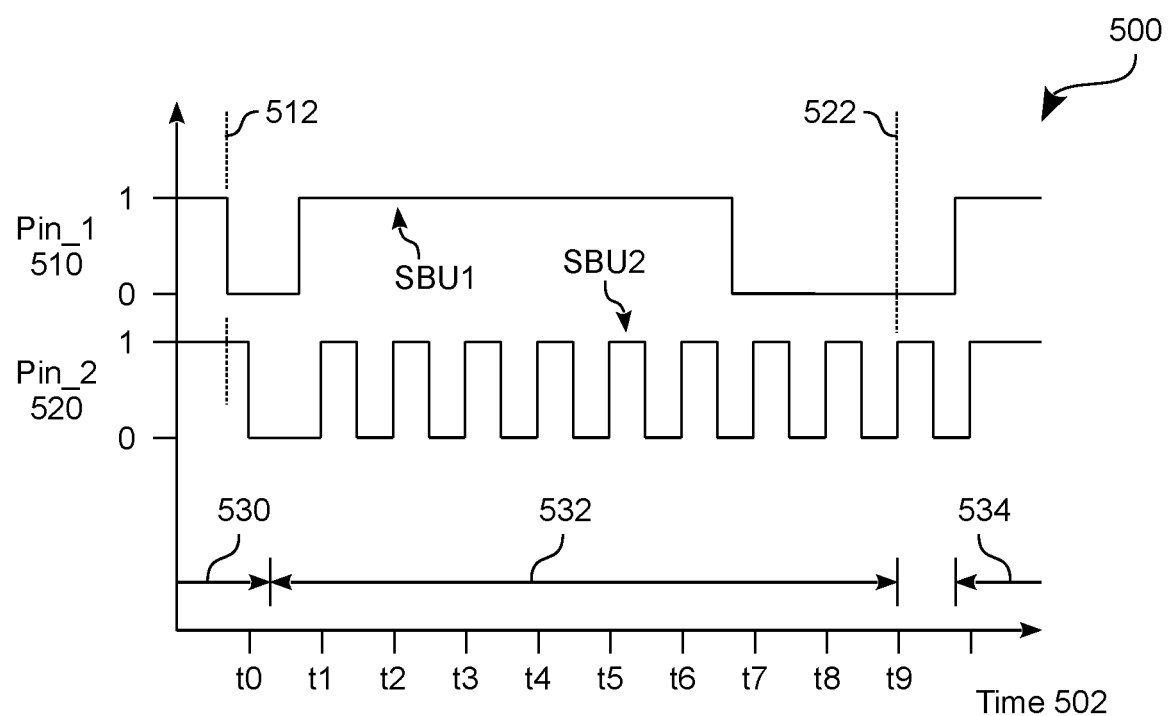
FIG. 5 shows timing diagrams each illustrating elements of a respective communication to identify a connection orientation according to a corresponding embodiment.
Figure 5:
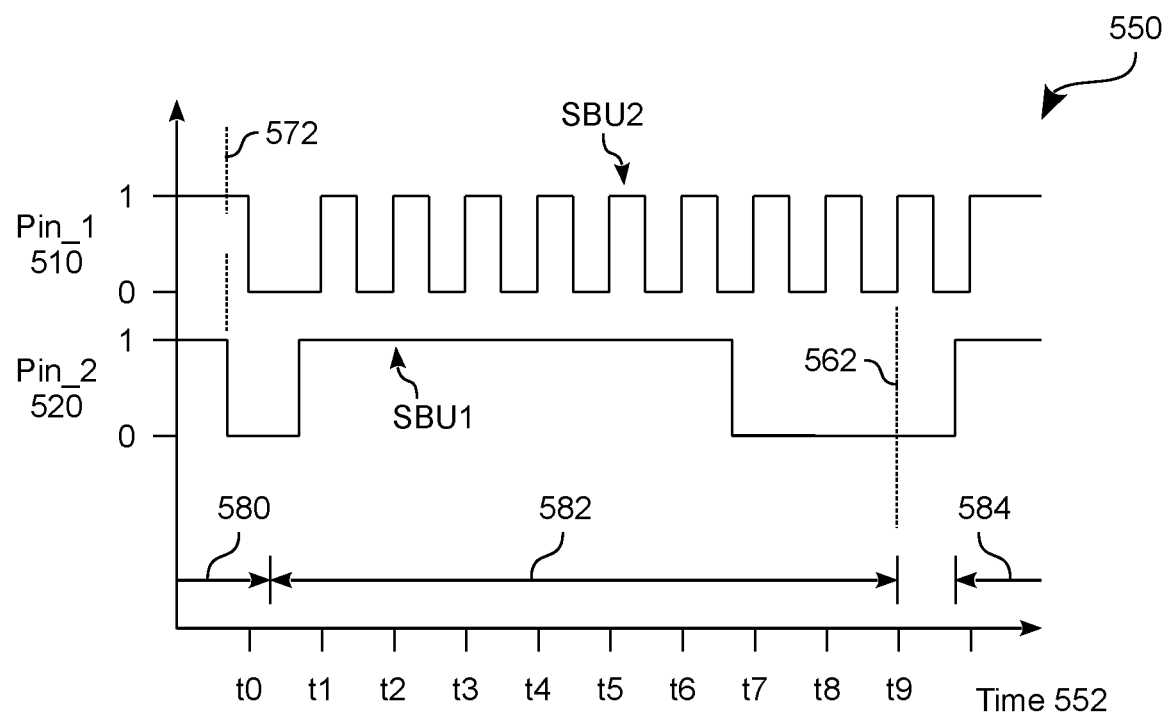

FIG. 5 shows timing diagrams 500, 550 for signals communicated each to indicate a respective connection orientation according to a corresponding embodiment. Signaling represented in timing diagram 500 (or in timing diagram 550) is communicated, for example, with one of devices 110, 130, 300, 400—e.g., to facilitate the determining of a connection orientation according to method 200.

Timing diagram 500 shows characteristics of signals which are communicated, over time 502, via respective conductive contacts—i.e., pin_1 510 and pin_2 520—of an IO interface. The IO interface is compatible (for example)

with a USB-C interface specification. Such signal characteristics are predefined as being variously indicative of when the communication of a token packet has yet to start, has started (but has yet to stop), or has stopped. Based on different signal characteristics during the communication of a token packet, a determination can be made as to how pin_1 510 and pin_2 520 are coupled each to communicate a particular respective one of sideband signals SBU1, SBU2.

As shown in timing diagram 500, a high-to-low signal transition 512 on pin_1 510, which precedes a next high-to-low transition on pin_2 520, indicates that a token start time period 530 is to end. During a subsequent token packet time period 532, sideband signals SBU1 and SBU2 are each to exhibit respective characteristics to distinguish themselves from each other. For example, multiple cycles of SBU2 take place during token packet time period 532 while SBU1 is maintained at one logic state. As a result, detector circuitry 160 or detector circuitry 360 (or other suitable circuit logic of a sink device) is able to identify—in the scenario illustrated by timing diagram 500—a first connection orientation wherein pin_1 510 is coupled to communicate SBU1, and wherein pin_2 520 is coupled to communicate SBU2. A subsequent low-to-high transition 522 on pin_2 520 provides a predefined packet stop signal condition to indicate that token packet time period 532 is to end. The packet stop event is followed, for example, by a subsequent time period 534 to allow for the detecting of some next token start or other information that may be communicated with SBU1 and SBU2.

In an alternative scenario illustrated by timing diagram 550, a high-to-low signal transition 572 on pin_2 520, which precedes a next high-to-low transition on pin_1 510, indicates that a token start time period 580 is to end. During a subsequent token packet time period 582, sideband signals SBU1 and SBU2 exhibit respective characteristics to distinguish themselves from each other, as described with reference to timing diagram 500. As a result, detector circuitry is able to identify a second connection orientation (different than that in the scenario for timing diagram 5000 wherein pin_1 510 is coupled to communicate SBU2, and wherein pin_2 520 is coupled to communicate SBU1. A subsequent low-to-high transition 562 on pin_1 510 provides a predefined packet stop signal condition—e.g., followed by a subsequent time period 584 to allow for the detecting of other information communicated with SBU1 and SBU2.

Figure 6:
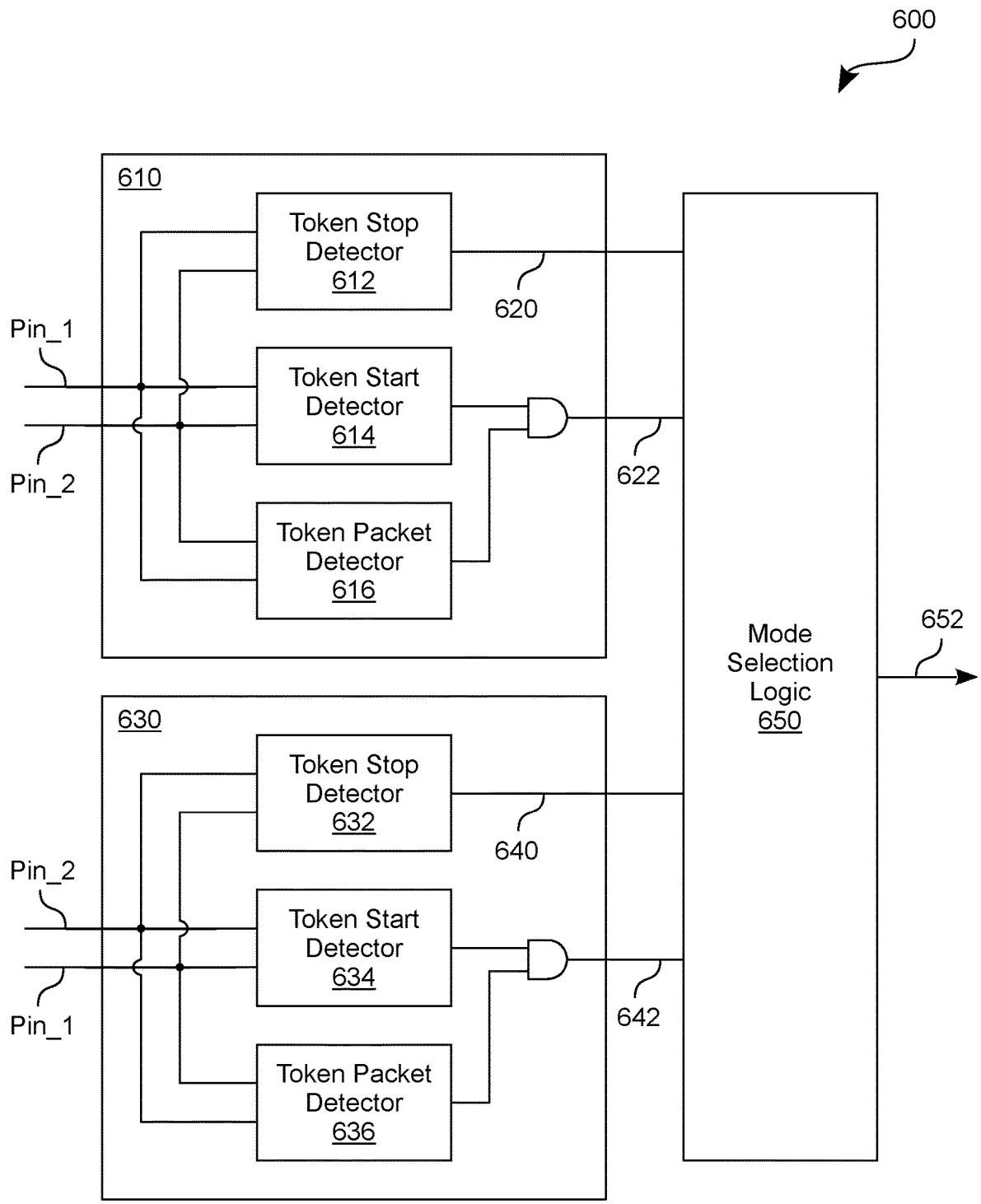
FIG. 6 illustrates a functional block diagram which shows elements of a device to identify a connection orientation according to an embodiment.

FIG. 6 shows features of a circuitry 600 to evaluate signaling which indicates a connection orientation according to an embodiment. Circuitry 600 includes features of detector circuitry 160 or detector circuitry 360, for example, and/or is operable to perform the identifying at 222 of operations 220.

As shown in FIG. 6, circuitry 600 comprises detector circuits 610, 630 variously coupled to receive—via contacts Pin_1, Pin_2—sideband signals SBU1, SBU2 that are each compatible with a respective sideband signal type of a USB-C specification. Some embodiments adapt functionality of one or more such sideband signal types to further support the identification of a connection orientation. Based on these adapted signals SBU1, SBU2, detectors 610, 630 each detect for respective signal characteristics which are indicative of a corresponding connection orientation.

For example, detector circuit 610 includes a token start detector 614 to detect for an instance of a predefined token start event such as one which includes the transition 512. A token packet detector 616 of detector circuit 610 detects for a test condition which includes respective distinguishing characteristics of SBU1, SBU2 during token packet time period 532 (for example). A token stop detector 612 of detector circuit 610 detects for an instance of a predefined token stop event such as one which includes the transition 522. Similarly, detector circuit 630 includes a token start detector 634 to detect for an instance of a predefined token start event such as one which includes the transition 572. A token packet detector 636 of detector circuit 630 detects for a test condition which includes respective distinguishing characteristics of SBU1, SBU2 during token packet time period 580 (for example). A token stop detector 632 of detector circuit 630 detects for an instance of a predefined token stop event such as one which includes the transition 562.

Based on such detecting, detector circuit 610 provides one or more signals (for example, signals 620, 622) to indicate the detection of first signal characteristics which are predefined as being indicative of a first connection orientation. Alternatively, detector circuit 630 provides one or more signals (for example, signals 640, 642) to indicate the detection of second signal characteristics which are predefined as being indicative of a second connection orientation. In such an embodiment, the first connection orientation includes a first correspondence of contacts Pin_1, Pin_2 to signals SBU1, SBU2, and the second connection orientation includes a second (e.g., opposite) correspondence of contacts Pin_1, Pin_2 to signals SBU1, SBU2. Based on signals from one or both of detector circuits 610, 630, mode selection logic 650 identifies a corresponding communication mode to be implemented, and provides control signaling 652 (e.g., including one of signals 162, 362) to switchedly enable a set of signal paths of the communication mode.

Figure 7:
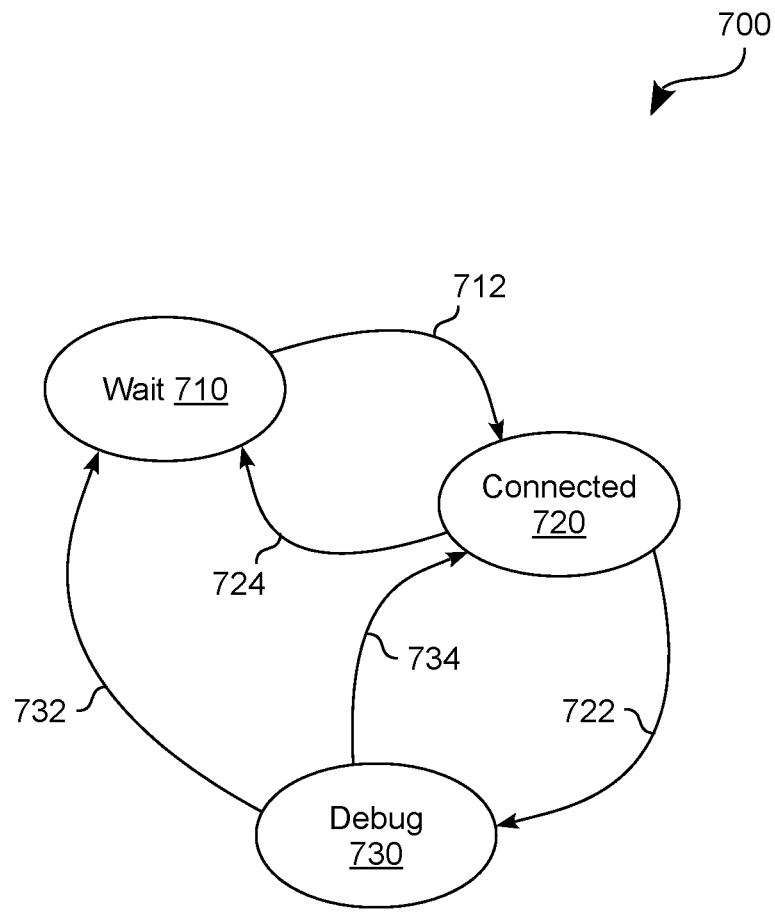
FIG. 7 shows a state diagram each illustrating operations of a device, according to an embodiment, which detects a connection orientation.

FIG. 7 shows a state diagram 700 illustrating operations of a sink device which identifies a connection orientation according to an embodiment. Operations such as those represented by state diagram 700 are performed, for example, with one of devices 130, 300.

As shown in FIG. 7, state diagram 700 includes a wait state 710 during which the sink device detects for a connection to an external device via an IO interface of the sink device. A transition 712 from wait state 710 to another state 720 is performed in response to a connection of a source device to the sink device. During state 720, operations are performed with the sink device to establish signal communications via the connection. Such operations are adapted, for example, from a protocol which is specified or otherwise indicated by a USB-C specification. When such signal communications are established, state diagram 700 performs a transition 722 from state 720 to a debug state 730. In some embodiments, state diagram further comprises a transition 724 from state 720 to wait state 710, and a transition 732 from state 730 to wait state 710, where the transitions 724, 732 are each in response to a respective disconnection of the source device from the sink device During debug state 730, the source device sends token start and token packet communications via sideband signals SBU1, SBU2. The sink device detects for signal characteristics of such token start and token packet communications and, based on such detecting, identifies an orientation of the connection between the two devices. The sink device then configures a communication mode which corresponds to the detected connection orientation, and—in some embodiments—locks the communication mode at least until a disconnection of the source device (and/or until the occurrence of some other predefined event). In some embodiments, one or more interrupts are generated at the sink device based on the detection of the connection orientation—e.g., including an interrupt to facilitate the emptying of one or more queues, the configuration of power management control circuitry, or the like. In some embodiments, operations during debug mode 730 omit one or more communications which, according to a USB-C specification, are otherwise to be performed to facilitate at least some characteristics of power delivery to the sink device. After the completion of debug operations, state diagram 700 performs a transition 734 from debug state 730 to state 720.

Figure 8:
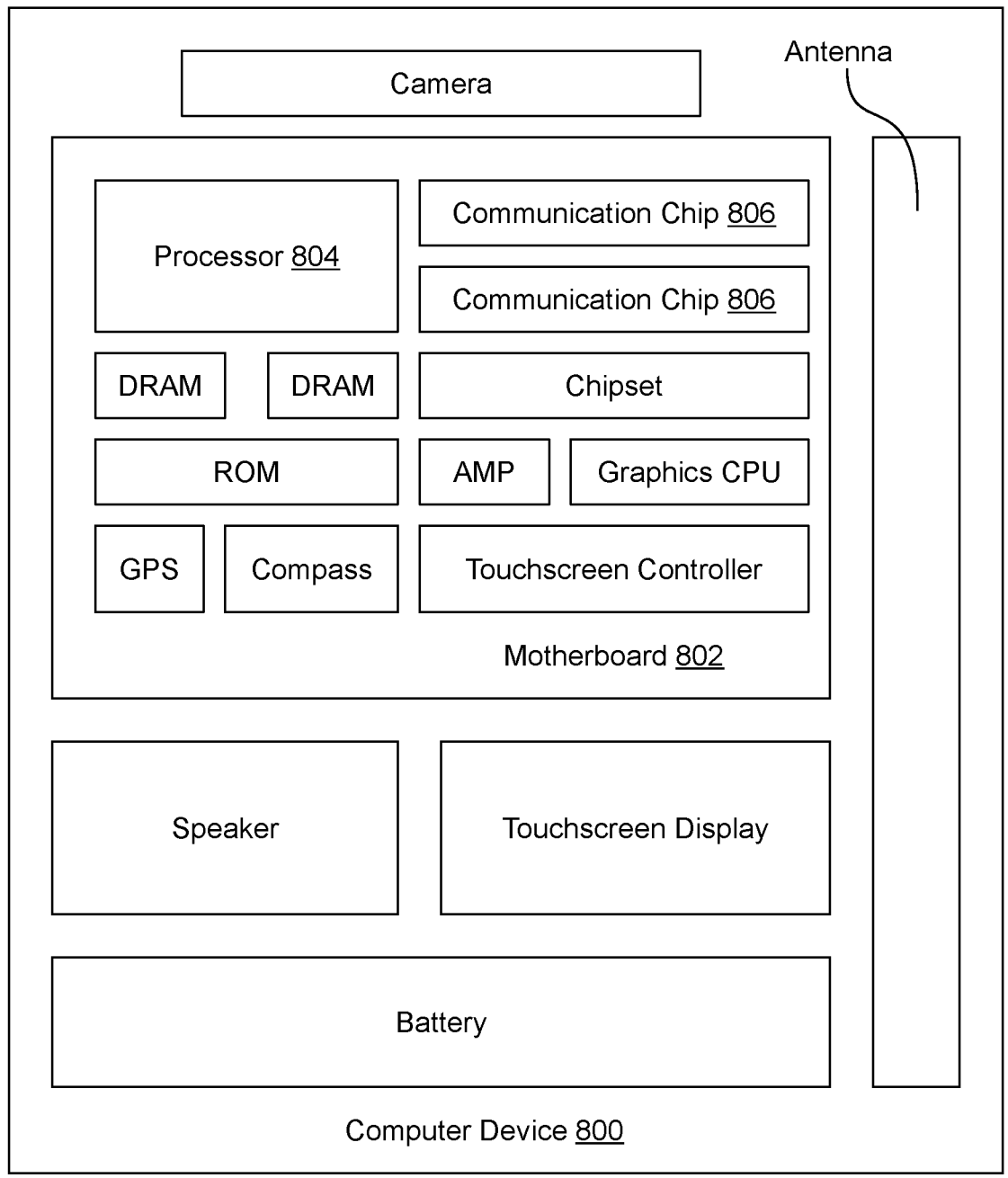
FIG. 8 illustrates a functional block diagram which shows a computing device in accordance with one embodiment.

FIG. 8 illustrates a computing device 800 in accordance with one embodiment. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804.

Depending on its applications, computing device 800 may include other components that may or may not be physically and electrically coupled to the board 802. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. The term "processor" may refer to any device or portion of a device that processes electronic data from registers and/or memory to transform that electronic data into other electronic data that may be stored in registers and/or memory. The communication chip 806 also includes an integrated circuit die packaged within the communication chip 806.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 9:
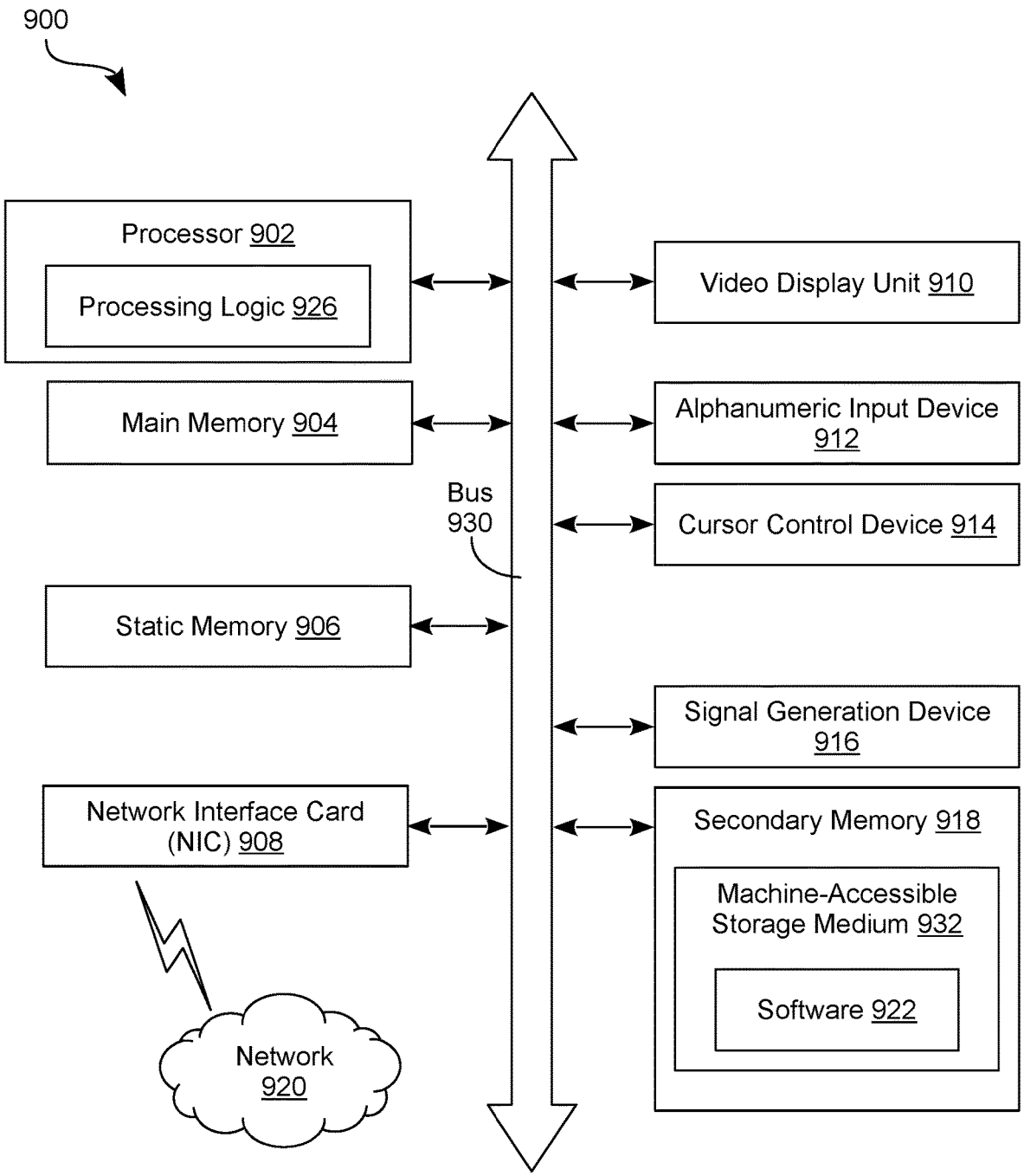
FIG. 9 illustrates a functional block diagram which shows an exemplary computer system, in accordance with one embodiment.

FIG. 9 illustrates a diagrammatic representation of a machine in the exemplary form of a computer system 900 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations described herein.

The computer system 900 may further include a network interface device 908. The computer system 900 also may include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 932 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

While the machine-accessible storage medium 932 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for determining an orientation of a connection to a circuit device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
    an input/output (IO) interface to couple the device to a second device, the IO interface comprising a first one or more conductive contacts to receive one or more signals from the second device, wherein the IO interface is compatible with a signal plan of an interface specification which identifies one or more signal types each to contribute to an identification of a connection orientation, wherein, for each of the first one or more conductive contacts:
        a relative location of the conductive contact corresponds, according to the signal plan, to a respective signal type other than any signal type which is to contribute to the identification of the connection orientation;
    first circuitry to identify, based on the one or more signals, an orientation of a connection to the IO interface;
    second circuitry, responsive to the first circuitry, to provide a communication mode of the device based on the orientation;
    third circuitry; and
    fourth circuitry coupled to the first one or more conductive contacts via the second circuitry, wherein the IO interface further comprises a second one or more conductive contacts which are each coupled to the fourth circuitry via the third circuitry, wherein, for each of the second one or more conductive contacts:
a relative location of the conductive contact corresponds, according to the signal plan, to a respective signal type which is to contribute to the identification of the connection orientation.

2. The device of claim 1, wherein the interface specification is a Universal Serial Bus Type-C specification.

3. The device of claim 2, wherein, for each of the first one or more conductive contacts:
the relative location of the conductive contact corresponds, according to the signal plan, to a respective sideband signal type.

4. The device of claim 1, wherein the second circuitry to provide the communication mode comprises the second circuitry to enable signal paths each between the fourth circuitry of the device and a respective one of a plurality of conductive contacts of the IO interface, the signal paths each independent of the third circuitry.

5. The device of claim 4, wherein:
the second one or more conductive contacts are further to receive a second one or more signals;
the third circuitry is further to identify, based on the second one or more signals, a second orientation of a second connection to the IO interface; and
the second circuitry is further to provide a second communication mode of the device based on the second orientation.

6. The device of claim 4, wherein the fourth circuitry is to participate in a debug of the device during the communication mode and during a boot-up sequence of the device.

7. The device of claim 1, wherein the orientation of the connection to the IO interface is identified while a functionality of the third circuitry to detect the orientation is disabled.

8. The device of claim 1, wherein the second circuitry is coupled to the first circuitry via a bus which is compatible with a bus specification.

9. The device of claim 8, wherein the bus specification is an I²C specification.

10. The device of claim 1, wherein the one or more signals comprises a pair of signals.

11. A device comprising:
a first input/output (IO) interface to couple the device to a second IO interface of a second device, wherein the second IO interface is compatible with a signal plan of an interface specification which identifies one or more signal types each to contribute to an identification of a connection orientation;
first circuitry coupled to transmit a first one or more signals, via the first IO interface, to one or more conductive contacts of the second IO interface, wherein, for each of the one or more conductive contacts:
a relative location of the conductive contact corresponds, according to the signal plan, to a respective signal type other than any signal type which is to contribute to the identification of the connection orientation;
wherein, based on the first one or more signals, the second device identifies an orientation of a connection to the IO interface, wherein a communication mode of the second device is to be provided based on the orientation; and
wherein the first circuitry is further to participate in communications with the second device via the IO interface during the communication mode, wherein, prior to a completion of a boot-up sequence of the second device, the first circuitry is to perform a debug process to evaluate a performance of the second device.

12. The device of claim 11, wherein the interface specification is a Universal Serial Bus Type-C specification.

13. The device of claim 12, wherein, for each of the one or more conductive contacts:
the relative location of the conductive contact corresponds, according to the signal plan, to a respective sideband signal type.

14. A system comprising:
a first device comprising:
an input/output (IO) interface to couple the system to a second device, the IO interface comprising a first one or more conductive contacts to receive one or more signals from the second device, wherein the IO interface is compatible with a signal plan of an interface specification which identifies one or more signal types each to contribute to an identification of a connection orientation, wherein, for each of the first one or more conductive contacts:
a relative location of the conductive contact corresponds, according to the signal plan, to a respective signal type other than any signal type which is to contribute to the identification of the connection orientation;
first circuitry to identify, based on the one or more signals, an orientation of a connection to the IO interface;
second circuitry, responsive to the first circuitry, to provide a communication mode of the first device based on the orientation;
third circuitry; and
fourth circuitry coupled to the first one or more conductive contacts via the second circuitry, wherein the IO interface further comprises a second one or more conductive contacts which are each coupled to the fourth circuitry via the third circuitry, wherein, for each of the second one or more conductive contacts:
a relative location of the conductive contact corresponds, according to the signal plan, to a respective signal type which is to contribute to the identification of the connection orientation; and
a display device coupled to the first device, the display device to display an image based on a communication via the IO interface.

15. The system of claim 14, wherein the interface specification is a Universal Serial Bus Type-C specification.

16. The system of claim 15, wherein, for each of the first one or more conductive contacts:
the relative location of the conductive contact corresponds, according to the signal plan, to a respective sideband signal type.

17. The system of claim 14, wherein the second circuitry to provide the communication mode comprises the second circuitry to enable signal paths each between the fourth circuitry of the first device and a respective one of a plurality of conductive contacts of the IO interface, the signal paths each independent of the third circuitry.

18. The system of claim 17, wherein:
the second one or more conductive contacts are further to receive a second one or more signals;
the third circuitry is further to identify, based on the second one or more signals, a second orientation of a second connection to the IO interface; and the second circuitry is further to provide a second communication mode of the first device based on the second orientation.

19. The system of claim 17, wherein the fourth circuitry is to participate in a debug of the first device during the communication mode and during a boot-up sequence of the first device.

\* \* \* \* \*